United States Patent [19]

Tabata et al.

[11] Patent Number: 4,574,364

[45] Date of Patent: Mar. 4, 1986

[54] METHOD AND APPARATUS FOR CONTROLLING IMAGE DISPLAY

[75] Inventors: Kuniaki Tabata, Tokyo; Susumu Tsuhara; Tetsuo Machida, both of Sagamihara; Hidefumi Iwami, Machida; Yasuyuki Okada, Sagamihara, all of Japan

[73] Assignee: Hitachi, Ltd., Tokyo, Japan

[21] Appl. No.: 443,872

[22] Filed: Nov. 23, 1982

[51] Int. Cl.[4] .............................................. G06F 3/153

[52] U.S. Cl. ..................................... 364/900; 364/300

[58] Field of Search ... 364/200 MS File, 900 MS File, 364/521, 300, 200, 900; 340/721, 724, 726, 727, 731, 754

[56] References Cited

U.S. PATENT DOCUMENTS

| | | | |
|---|---|---|---|
| 4,267,573 | 5/1981 | Chaikin et al. | 340/727 X |
| 4,412,294 | 10/1983 | Watts et al. | 340/726 X |
| 4,437,093 | 3/1984 | Bradley | 340/726 |

OTHER PUBLICATIONS

"Object-Oriented Software Systems", BYTE, Aug. 1981, David Robson, pp. 74-86.

"The Smalltalk-80 Virtual Machine", BYTE, Aug. 1981, Glenn Krasner, pp. 300-318.

BYTE, Aug. 1981, vol. 6, No. 8, pp. 378-387, Ted Kaehler, "Virtual Memory for an Object-Oriented Language".

BYTE, Aug. 1981, vol. 6, No. 8, pp. 36-86, Xerox Learning Research Group, "The Smalltalk-80 System".

BYTE, Aug. 1981, vol. 6, No. 8, pp. 90-147, Larry Teslar, "The Smalltalk Environment".

BYTE, Aug. 1981, vol. 6, No. 8, pp. 168-194, Daniel Ingalls, "The Smalltalk Graphics Kernal".

*Primary Examiner*—Thomas M. Heckler
*Attorney, Agent, or Firm*—Antonelli, Terry & Wands

[57] ABSTRACT

In a method for controlling an image display apparatus having a file management table for managing information including titles of image data stored in a file memory and storage addresses therefor and a window management table for managing information including locations and sizes of windows on a display screen and quarry locations of the image data, the content of the window management table in accordance with an input command is updated so that the location and size of the window, the superposition of the windows and the scrolling of the window can be interactively changed.

10 Claims, 10 Drawing Figures

FIG. 4A

2A

| TITLE OF IMAGE DATA | STORAGE ADDRESS | SIZE OF IMAGE | | DATA LENGTH |
|---|---|---|---|---|
| | | LATERAL (Sm) | LONGITUDINAL (Tm) | |
| | | | | |
| | | | | |
| | | | | |
| | | | | |

FIG. 4B

2B

| WINDOW NUMBER | WINDOW LOCATION | | WINDOW SIZE | | WINDOW LEVEL (Li) | FLAG (Fi) | TITLE OF IMAGE DATA (Di) | IMAGE QUARRY LOCATION | |
|---|---|---|---|---|---|---|---|---|---|
| | LATERAL (Xi) | LONGITUDINAL (Yi) | LATERAL (Wi) | LONGITUDINAL (Hi) | | | | LATERAL (Um) | LONGITUDINAL (Vm) |
| 0 | | | | | | | | | |
| 1 | | | | | | | | | |
| 2 | | | | | | | | | |
| ⋮ | | | | | | | | | |
| i | | | | | | | | | |
| ⋮ | | | | | | | | | |
| ⋮ | | | | | | | | | |

FIG. 6

| NO. | COMMAND | FUNCTION |
|---|---|---|
| 1 | CREATE | CREATE WINDOW |
| 2 | DELETE | DELETE WINDOW |
| 3 | SCALE | CHANGE WINDOW SIZE |
| 4 | MOVE | MOVE WINDOW |
| 5 | FLOAT | POSITION A WINDOW ABOVE ANOTHER WINDOW |
| 6 | SINK | POSITION A WINDOW BELOW ANOTHER WINDOW |
| 7 | FIND | RETRIEVE AND DISPLAY IMAGE DATA |
| 8 | SCROLL | SCROLL IMAGE DATA |
| 9 | EXCHANGE | EXCHANGE WINDOWS BETWEEN IMAGE DATA |

METHOD AND APPARATUS FOR CONTROLLING IMAGE DISPLAY

BACKGROUND OF THE INVENTION

The present invention relates to a control method for a multi-window image display which is suitable for displaying document image data such as charts, seal impression, maps and business slips.

A bit map display is usually used as an image display connected to a computer: a bit map is also called a display memory and stores data to be displayed at lattice crosspoints of two-dimensional images. By dividing a screen of the bit map display into a certain number of areas (windows), it is possible to simultaneously display a plurality of image data and independently control them. It is called a multi-window display and has an advantage of easiness of retrieval and comparison of the image data.

The concept of the multi-window display has been known and several applications thereof have been known. Many of them relate to a character display and are intended to display coded character data such as alphanumeric characters as described in an article "A time-sharing display terminal session manager" by J. M. McCrossion et al, IBM System Journal, Vol. 17, No. 3, 1978, pages 260–274.

As another form of the multi-window display, "a multi-graphic display" has been proposed (see Japanese Laid-Open Patent Application 54-75225). In the proposed display, one screen of display data is divided into blocks which are chained with each other to allow the editing of the display data, and the individual display data can be rotated, shifted or scaled block by block. The data to be handled is graphic data such as lines or arcs.

A third category is the multi-window display for the image data. As one example thereof, a dual-screen television which can simultaneously display two programs has been proposed (see Nikkei Electronics, Feb. 26, 1977, pages 127–132). The dual-screen television composes television screens by the timing control of a video signal and has no capability to interactively carry out scroll of the image data, or creation, deletion, movement or size modification of the window.

SUMMARY OF THE INVENTION

It is an object of the present invention to provide a control method for a multi-window image display which enables interactive control for position and size modifications of the windows, superposition modification of the windows, and deletion and creation of the windows.

It is another object of the present invention to provide a control method for laterally or vertically scrolling the image data window by window and cutting out and acquiring (hereinafter referred to as "quarrying") a data of a square area from the image data to display it in the window.

In the multi-window display, a plurality of windows $w_1$, $w_2$, . . . are defined on a screen D of the image display and partial data of image a and image b (data for rectangular areas shown by broken lines) are displayed on the respective windows, as shown in FIG. 1.

In accordance with the present invention, it is possible to change the display content of the multi-window from (1) to (2) of FIG. 2 (to change quarry locations of sub-images from the images a and b), that is, to scroll the multi-window so that the image data is laterally and vertically scrolled window by window.

In accordance with the present invention, it is also possible to change the locations of the windows $w_1$ and $w_2$ on the screen such as from (2) to (3) of FIG. 2.

In accordance with the present invention, it is also possible to change the sizes of the windows $w_1$ and $w_2$ on the screen such as from (3) to (4) of FIG. 2.

In accordance with the present invention, it is also possible to change the superposition of the windows $w_1$ and $w_2$ such as from (4) to (5) of FIG. 2. In (4) of FIG. 2, the window $w_2$ is located above the window $w_1$ and in (5) of FIG. 2, the window $w_1$ is located above the window $w_2$.

In accordance with the present invention, it is also possible to delete or create the window on the screen such as from (5) to (6) of FIG. 2. In (6) of FIG. 2, the window $w_2$ is deleted and new windows $w_3$ and $w_4$ are created.

The other objects and features of the present invention will become apparent from the following detailed description of the embodiment when read in conjunction with the accompanying drawings.

BRIEF DESCRIPTION OF THE DRAWINGS

FIGS. 4A and 4B show configurations of a file management table and a window management table used in the present invention.

FIG. 6 shows examples of commands.

DESCRIPTION OF THE PREFERRED EMBODIMENTS

The present invention provides a control method to achieve those functions. The preferred embodiments of the present invention will now be described in detail.

Figure 1:
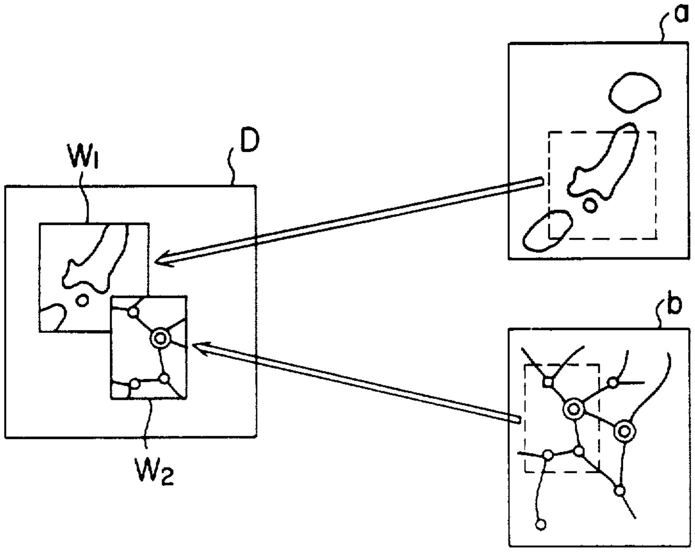
FIG. 1 shows a conceptual chart of a multi-window display.
Figure 2:
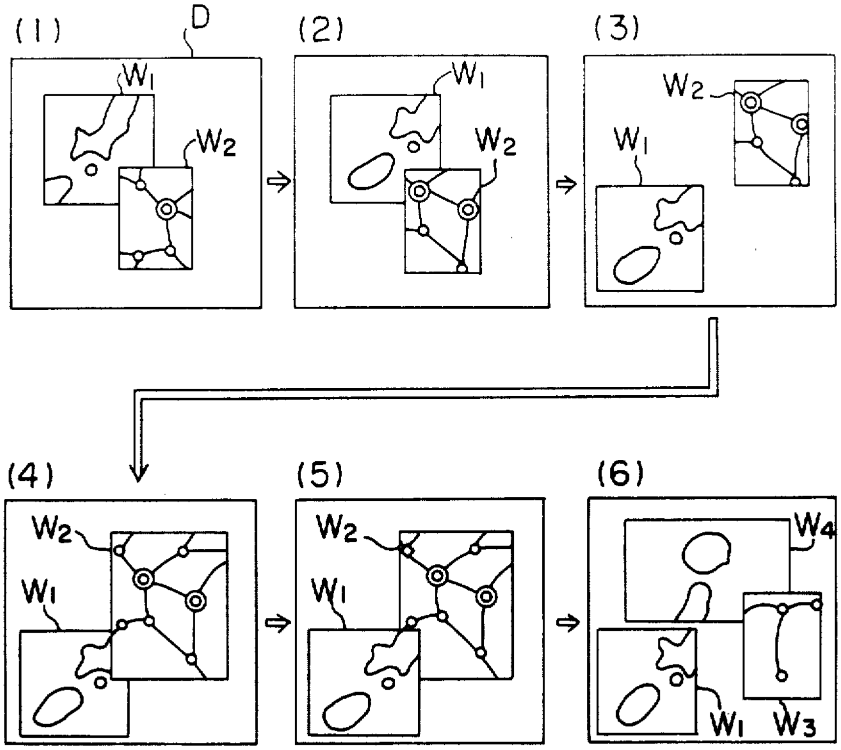
FIG. 2 shows a conceptual chart of display functions attainable by the present invention.
Figure 3:
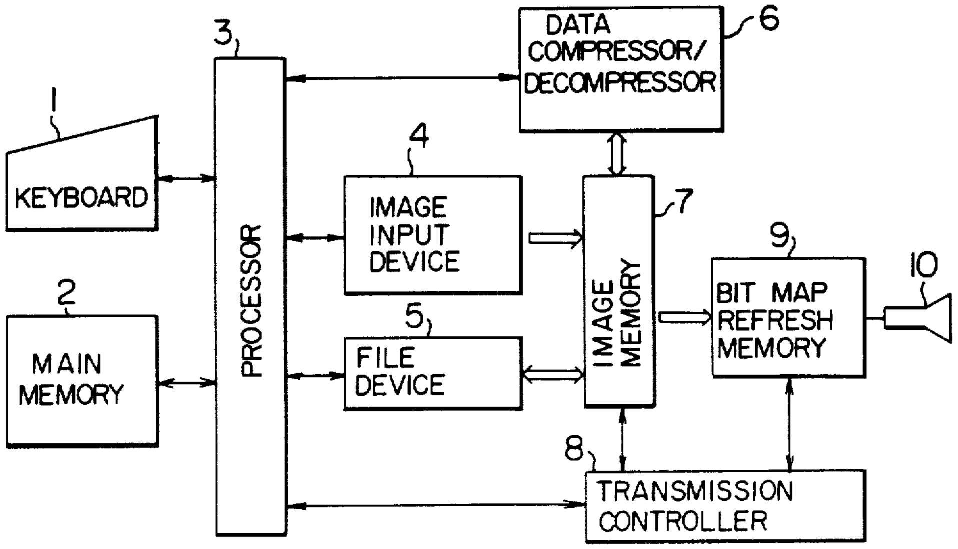
FIG. 3 shows a block diagram of one embodiment of the present invention.
Figure 5:
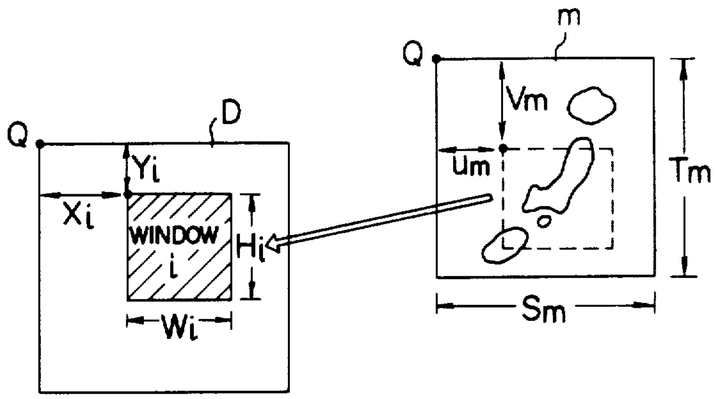
FIG. 5 shows items of the window management table.

FIG. 3 shows one embodiment of the present invention. The apparatus of the present invention comprises a keyboard 1 for inputting coded data and commands, a memory 2 for storing programs and tables, a processor 3 such as a microprocessor, an image input device 4 such as a facsimile device, a file device 5 for storing the image data, a data compressor-decompressor 6 for compressing and decompressing the image data, an image memory 7 for temporarily storing the image data, a transfer controller 8 for controlling the data transfer between the image memory 7 and a bit map refresh memory 9, the display bit map refresh memory 9 and an image display 10. Each of those units per se is known. The image data to be displayed on the image display 10 is designated by the keyboard 1 and the corresponding image data is retrieved from the file device 5 in which the image data is previously stored. The image data to be stored is inputted from the image input device 4, compressed by the data compressor-decompressor 6 and supplied to the file device 5 and stored therein. In order to manage the data stored in the file device 5, the main memory 2 has a file management table 2A which includes retrieval keys (such as titles of image data) for retrieving the image data, storage addresses, sizes of the images and data lengths, as shown in FIG. 4A. This attribute data is prepared by the processor 3 in accordance with the commands entered from the keyboard 1. The image display 10 displays the image in a plurality of areas called windows. The attributes of the windows are defined by a window management table 2B contained in the main memory 2. The window management table 2B includes locations and sizes of the windows, levels thereof, titles of image data to be displayed in the windows and quarry locations of the image data, as shown in FIG. 4B. For example, when an image m is to be displayed on a window i, the items of the window management table 2B are represented as shown in FIG. 5, in which $X_i$ and $Y_i$ represent the location of the window i, $W_i$ and $H_i$ represent the size of the window i, $U_m$ and $V_m$ represent the quarry location for the image m, and $S_m$ and $T_m$ represent the size of the image m.

Figure 7:
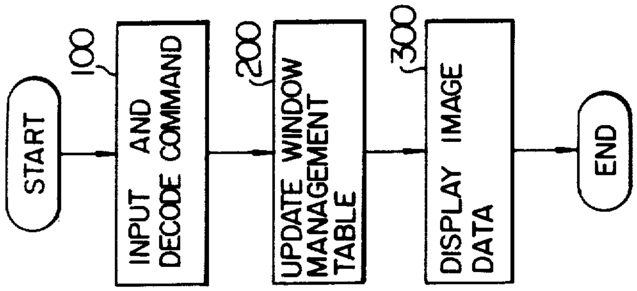
FIG. 7 shows a flow chart of a program to be executed by a processor.

FIG. 6 shows examples of commands for carrying out the multi-window display. Those commands are inputted from the keyboard 1 and decoded by a program in the processor 3 for the execution. Steps of the program executed by the processor 3 are shown in FIG. 7. Numeral 100 denotes a step for reading in a command from the keyboard 1 and decoding it, numeral 200 denotes a step for updating the content of the window management table in accordance with the command, and numeral 300 denotes a step for updating the refresh memory 9 for displaying the image data in a predetermined window by referring to the window management table and the file management table. Numeral 400 denotes a step for displaying the image data of the updated refresh memory 9. The contents of the program for each command are explained below.

[A] CREATION OF WINDOW (CREATE COMMAND)

(i) Input and decode command (100)

The location (lateral and longitudinal) on the screen and the size (lateral and longitudinal), of the window to be created are designated by the keyboard. The processor reads in this data.

(ii) Update window management table (200)

Figure 8:
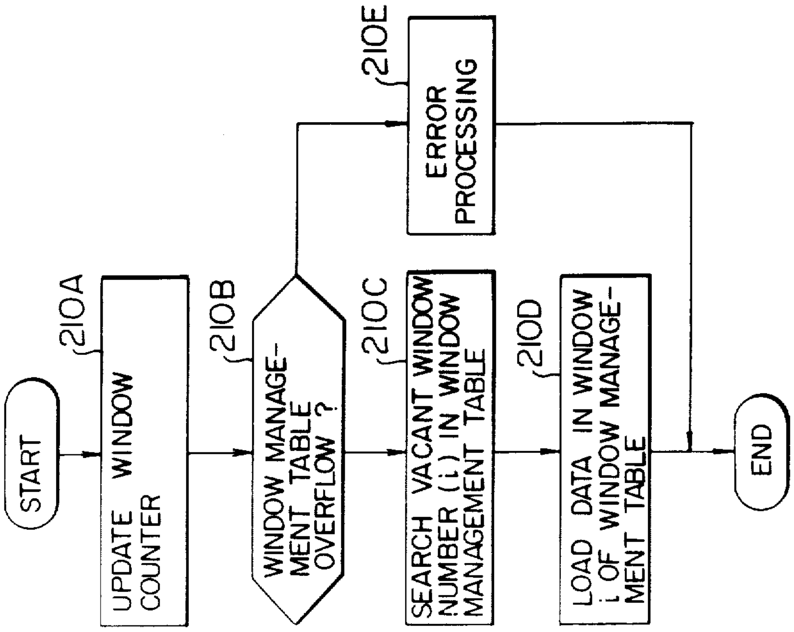
FIG. 8 shows a flow chart for illustrating a procedure for updating the window management table in accordance with a CREATE command.

Detail of the step 200 for the creation of the window is shown in FIG. 8. In a sub-step 210A, the content of a window counter (WC) which indicates the number of windows created on the screen is incremented by one. Since the number of windows which can be registered in the window management table 2B is limited, the number is checked in a sub-step 210B. If the count of the window counter WC is over the limit, the window management table 2B overflows. Accordingly, an error processing such as displaying of a warning message is carried out in a sub-step 210E. If no overflow occurs, it means that there is an unused window on the screen and it is searched in a sub-step 210C. Flags on the window management table indicate the usage status of the windows. In a sub-step 210D, a new window i is created, where i is one of the unused or vacant window numbers ($F_i=0$) and necessary data is registered in the window management table. The data designated by the keyboard (location and size of the window) is registered in the window management table as the attributes ($X_i$, $Y_i$, $W_i$, $H_i$) of the window i. The level in the window management table indicates the vertical relationship of the superposition of the window on the screen. When a window having a higher level is to be displayed on the same location of a window having a lower level, the former is superimposed on the latter. A newly created window has a highest level of the existing windows. For the new window i, a level $L_i$ is defined by $L_i=WC-1$. For example, when no other window than the window i is present, WC=1 and hence $L_i=0$. When one window is present in addition to the window i, WC=2 and hence $L_i=1$. The reason for defining the level in this manner is to facilitate the processing for the commands (FLOAT and SINK) which require the change of superposition of the windows. At the time when the window i is created, the image data to be displayed on the window i has not been designated but it is necessary to clearly indicate that the window has been created. Thus, the newly created window displays image data of a specific pattern (for example, all-white, all-black or lattice pattern) and the title of the image data ($D_i$) is registered in the window management table for the window i. After the registration, the flag $F_i$ of the window i in the window management table is set to "1" to indicate the creation of the window.

(iii) Update refresh memory (300)

The image data for the windows other than the newly created window i are held in the refresh memory 9. The level of the window i is higher than the level of any other window. Accordingly, the image data for the window i only is retrieved from the image file device 5 and transferred to the refresh memory 9. The title of the image data to be displayed in the window i is stored in the window management table and the storage address of the image data, the size (lateral and longitudinal) of the image and the data length are stored in the file management table. The image data is compressed and the compressed image data is stored in the file device 5. It is decompressed by the compressor/decompressor 6 and the decompressed data is transferred to the image memory 7. Only the data for the predetermined rectangular area designated by the window management table 2B is quarried from the image data of the image memory 7 and transferred to a predetermined area of the refresh memory 9. The quarry processing is controlled by the transfer controller 8. By utilizing a transfer control system as disclosed in Japanese Utility Model Application 55-85178 (Laid-Open Application 57-10067) filed by the same applicant as the present applicant, the quarry processing can be carried out at a high speed.

(iv) Display image data

The image data stored in the refresh memory 9 is displayed with a predetermined timing.

[B] DELETION OF WINDOW (DELETE COMMAND)

(i) Input and decode command (100)

The window number to be deleted is designated by the keyboard 1 and read in by the processor 3. The window number is denoted by j.

(ii) Update window management table (200)

Figure 9:
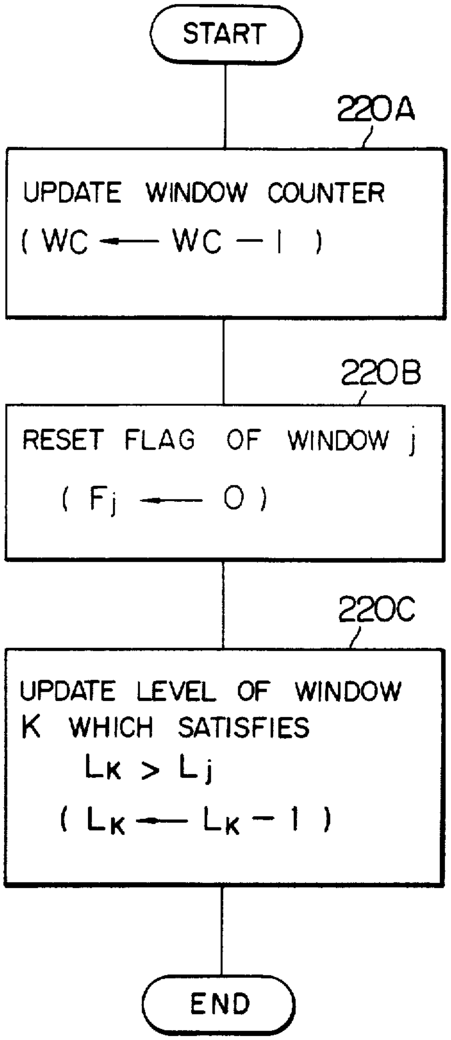
FIG. 9 shows a flow chart for illustrating a procedure for updating the window management table in accordance with a DELETE command.

The content of the step 200 for the deletion of the window is shown in detail in FIG. 9. In a substep 220A, the content (WC) of the window counter is decremented by one. The flag $F_j$ of the window j to be deleted is reset to "0" in a sub-step 200B to release the number j as an unused window number. Since the window j is deleted, it is necessary to update the levels of the windows having higher levels than $L_j$. This is carried out in a sub-step 220C, in which the levels of the window k which satisfies $L_k > L_j$ is updated in a manner of $L_k \leftarrow L_k - 1$.

(iii) Update refresh memory and Display image data (300, 400)

The image data for all of the windows registered in the window management table is retrieved from the image file device 5 and displayed on the display 10. This processing is carried out sequentially starting from the lowest level window. The processing for the respective windows is identical to that of [A] and hence it is not explained here. The flag of the window j in the window management table is now in a reset state and hence the window j is neglected in the step 300. As a result, the window j is deleted on the display.

[C] CHANGE OF SIZE OF WIDOW (SCALE COMMAND)

(i) Input and decode command (100)

The window number and the size after the change are designated by the keyboard 1 and read in by the processor 3. The window number is denoted by j and the size after the change is denoted by $w_j$ (lateral) and $\hat{H}_j$ (longitudinal).

(ii) Update window management table (200)

The data $W_j$ and $H_j$ of the window j in the window management table are changed to $\hat{W}_j$ and $\hat{H}_j$, respectively. Other data in the window management table is not changed.

(iii) Update refresh memory and Display image data (300, 400)

The steps 300 and 400 are carried out sequentially starting from the lowest level window as is done in the window deletion processing.

[D] MOVEMENT OF WINDOW (MOVE COMMAND)

(i) Input and decode command (100)

The window number to be moved and the coordinates of the move-to location on the screen are designated by the keyboard 1 and read in by the processor 3. The window number is denoted by j and the coordinates of the move-to location are denoted by $\hat{X}_j$ (lateral) and $\hat{Y}_j$ (longitudinal).

(ii) Update window management table (200 )

The data of the window j and $X_i$ and $Y_i$ in the window management table are changed to $\hat{X}_j$ and $\hat{Y}_j$, respectively.

(iii) Update refresh memory and Display image data (300, 400)

The steps 300 and 400 are identical to those of the window deletion processing and hence it is not explained here.

[E] CHANGE OF SUPERPOSITION OF WINDOWS (FLOAT COMMAND)

(i) Input and decode command (100)

When the window j is to be displayed in superposition on the window i, the window numbers i and j are designated by the keyboard 1 and read in by the processor 3. The coordinates (lateral and longitudinal) of the display locations of the windows are not changed.

(ii) Update window management table (200)

The levels of the windows registered in the window management table are changed as follows.

(1) For the window k which satisfies $L_j + 1 \leq L_k \leq L_i$, the level is changed in a manner of $L_k \leftarrow L_k - 1$.

(2) For the window j, the level is changed in a manner of $L_j \leftarrow$ [level of the window i before the change]

(3) For other windows, the levels are not changed.

(iii) Update refresh memory and Display image data (300, 400)

The steps 300 and 400 are identical to those of the window deletion processing except that the image data of only the window j and the windows having higher levels than the window j are displayed.

[F] CHANGE OF SUPERPOSITION OF WINDOW (SINK COMMAND)

(i) Input and decode command (100)

When the window j is to be displayed in superposition beneath the window i, the window numbers j and i are designated by the keyboard 1 and read in by the processor 3. The coordinates (lateral and longitudinal) of the display locations of the windows are not changed.

(ii) Update window management table (200)

The levels of the windows registered in the window management table are changed as follows.

(1) For the window k which satisfies $L_i \leq L_k \leq L_i - 1$, the level is changed in a manner of $L_k \leftarrow L_k + 1$.

(2) For the window j, the level is changed in a manner of $L_j \leftarrow$ [level of the window i before the change]

(3) For other windows, the levels are not changed.

(iii) Update refresh memory and Display image data (300, 400)

The steps 300 and 400 are identical to those of the window deletion processing except that the image data of only the windows having higher levels than the window j is displayed.

[G] RETRIEVAL AND DISPLAY OF IMAGE DATA (FIND COMMAND)

(i) Input and decode command (100)

The location $(U_m, V_m)$ of the rectangular area to be quarried from the image data m and the window number j in which it is to be displayed are designated by the keyboard i and read in by the processor 3.

(ii) Update window management table (200)

The title of the image data and the quarry location (lateral and longitudinal coordinates) of the content registered in the window management table for the window j are changed to m, $U_m$ and $V_m$, respectively, designated by the keyboard 1.

(iii) Update refresh memory and Display image data (300, 400)

The steps 300 and 400 are identical to those of the window deletion processing except that the image data of only the window j and the windows having higher levels than the window j is displayed.

[H] SCROLL OF IMAGE DATA (SCROLL COMMAND)

(i) Input and decode command (100)

The scroll is a processing to change the quarry location for the image data to be displayed. The window number to be scrolled and the new scroll location are designated by the keyboard 1 and read in by the processor 3. The window number is denoted by j and the new quarry location is denoted by $\hat{U}_m$ (lateral) and $\hat{V}_m$ (longitudinal), where m denotes the title of the image data displayed in the window j.

(ii) Update window management table (200)

The quarry location of the content registered in the window management table for the window j is changed to $\hat{U}_m$ and $\hat{V}_m$ designated by the keyboard 1.

(iii) Update refresh memory and Display image data (300, 400)

The steps 300 and 400 are identical to those of the window deletion processing except that the image data of only the window j and the windows having higher levels than the window j is displayed.

[I] EXCHANGE OF IMAGE DATA (EXCHANGE COMMAND)

(i) Input and decode command (100)

This command carries out the exchange of image data to be displayed, between two windows. The window numbers i and j for the exchange are designated by the keyboard 1 and read in by the processor 3.

(ii) Update window management table (200)

The titles of image data and the quarry locations registered in the window management table are exchanged between the windows i and j.

(iii) Update refresh memory and Display image data (300, 400)

The image data is displayed sequentially starting from the lowest level window as is done in the window deletion processing. The image data is displayed only for the window having levels equal to or higher than $L_i$ or $L_j$.

As described hereinabove, according to the present invention, a plurality of data is simultaneously displayed by dividing the screen into a number of windows and the respective image can be independently retrieved and the comparison of the image data is facilitated.

What is claimed is:

1. An image display control system comprising:

a file device for storing a plurality of image data;

image display means for displaying partial areas of said image data in a plurality of windows on a display screen;

a memory containing a file management table for managing information including titles of image data stored in said file device and storage addresses therefor and a window management table for managing information including locations and sizes of the windows on the display screen, titles of the image data, window levels indicative of the order of superposition of the windows on the display screen and quarry locations of the image data in the memory;

an input device for inputting commands and data on said locations and sizes of the windows, said titles of the image data, said window levels, and the quarry locations of the image data for storage in said memory; and a processor connected to said image display means, said memory, said input device and said file device for reading out the image data from said file device in accordance with a command indicative of execution of display inputted from said input device for controlling the display of the desired quarried images obtained from said file device in the windows of said image display means on the basis of data stored in said file management table and said window management table.

2. A method for controlling an image display apparatus having a file management table in which information including retrieval keys for image data stored in a file memory and storage addresses therefor is stored and a window management table in which information including locations and sizes of windows on a display screen, titles of the image data, window levels indicative of the order of superposition of the windows on the display screen, and quarry locations of the image data in the memory is stored, comprising:

a first step for reading in a command from an input device and decoding said command;

a second step for updating the content of said window management table in accordance with the content of said command; and a third step for displaying the image data in a predetermined window on the display screen by referring said window management table and said file management table.

3. A method for controlling an image display apparatus according to claim 2, wherein:

in said first step, a command for creating a predetermined window and a data for designating a location and a size on the display screen of the window to be created are inputted;

in said second step, the number of windows on the display screen including the window to be created is compared with a predetermined value and if it is within the predetermined value, said input data is registered in said window management table; and in said third step, the image data retrieved from said file device is displayed in the window having the location and the size designated by said input data.

4. A method for controlling an image display apparatus according to claim 2, wherein:

in said first step, a command for deleting a predetermined window and a data for indicating the window to be deleted are inputted;

in said second step, a flag bit in said window management table corresponding to the window to be deleted is reset; and in said third step, the image data for the windows registered in said window management table and having flag bits thereof set are retrieved from said file device and displayed.

5. A method for controlling an image display apparatus according to claim 2, wherein:

in said first step, a command for changing a size of a predetermined window, a data for indicating said window and a data for indicating a size of the window after the change are inputted;

in a second step, a data on a size of said window registered in said window management table is changed to said input data; and in said third step, the image data is displayed in the window having the changed size by referring said window management table and said file management table.

6. A method for controlling an image display apparatus according to claim 2, wherein:

in said first step, a command for moving a predetermined window and a data for indicating said window and a move-to location therefor are inputted;

in said second step, a data on a location of said window registered in said window management table is changed to said input data, and in said third step, the image data is displayed in the window at the changed location by referring said window management table and said file management table.

7. A method for controlling an image display apparatus according to claim 2, wherein:

in said first step, a command for changing superposition of predetermined windows and a data for indicating the windows whose superposition is to be changed are inputted;

in said second step, ones of said window levels in said window management table corresponding to the windows whose superposition is to be changed are changed in accordance with said input data; and in said third step, the image data are displayed in the windows in the order of window levels registered in said window management table.

8. A method for controlling an image display apparatus according to claim 2, wherein:

in said first step, a command for retrieving and displaying an image data and a data for indicating a location of rectangular area to be quarried from the image data and a window in which the quarried image data is to be displayed are inputted;

in said second step, a data on a title of image data and the quarry location for said window registered in said window management table is changed in accordance with said input data; and in said third step, the quarried data of the image data after the change is displayed in the window designated by said input data.

9. A method for controlling an image display apparatus according to claim 2, wherein:

in said first step, a command for scrolling a predetermined window and a data for indicating said window and a new quarry location of the image data for said window are inputted;

in said second step, a data on the quarry location for said window registered in said window management table is changed in accordance with said input data; and in said third step, the image data of the changed quarry location is displayed in the window designated by said input data.

10. A method for controlling an image display apparatus according to claim 2, wherein:

in said first step, a command for exchanging image data to be displayed, between a plurality of predetermined windows and a data for indicating said windows for the exchange are inputted;

in said second step, the image data and the quarry locations for said windows registered in said window management table are exchanged; and in said third step, the image data are displayed in said windows by referring the changed window management table and said file management table.

* * * * *